(12) United States Patent
Thrift et al.

(10) Patent No.: US 10,571,055 B2
(45) Date of Patent: Feb. 25, 2020

(54) BLOCK FITTING AND SEAL STRUCTURE

(71) Applicant: TI GROUP AUTOMOTIVE SYSTEMS, LLC, Auburn Hills, MI (US)

(72) Inventors: Charles Thrift, Milford, MI (US); Jeffrey Hoste, Saint Clair Shores, MI (US); Cassandra Billock, Saint Clair Township, MI (US)

(73) Assignee: TI GROUP AUTOMOTIVE SYSTEMS, LLC, Auburn Hills, MI (US)

( * ) Notice: Subject to any disclaimer, the term of this patent is extended or adjusted under 35 U.S.C. 154(b) by 716 days.

(21) Appl. No.: 14/919,334

(22) Filed: Oct. 21, 2015

(65) Prior Publication Data

US 2017/0059064 A1    Mar. 2, 2017

Related U.S. Application Data

(60) Provisional application No. 62/210,266, filed on Aug. 26, 2015.

(51) Int. Cl.
*F16L 23/18* (2006.01)
*F16L 19/025* (2006.01)

(52) U.S. Cl.
CPC ............. *F16L 19/025* (2013.01); *F16L 23/18* (2013.01)

(58) Field of Classification Search
CPC ..... F16L 19/025; F16L 23/032; F16L 23/028; F16L 23/18
USPC ........................................................ 285/205
See application file for complete search history.

(56) References Cited

U.S. PATENT DOCUMENTS

| 6,161,875 | A  | * | 12/2000 | Yamaji .................. F16K 27/003 |
|           |    |   |         | 285/124.1 |
| 6,834,893 | B2 |   | 12/2004 | Schroeder et al. |
| 6,857,638 | B2 |   | 2/2005  | Dupont et al. |
| 6,969,094 | B2 |   | 11/2005 | Fröhling et al. |
| 7,621,568 | B2 |   | 11/2009 | Schroeder et al. |
| 9,074,686 | B2 | * | 7/2015  | Doyle ..................... B23P 11/02 |

(Continued)

FOREIGN PATENT DOCUMENTS

DE      102008044095 A1    7/2009
EP        1 912 012 A1     4/2008

(Continued)

OTHER PUBLICATIONS

"Undated prior art print of fitting with polymeric guide sleeve on male end portion".

(Continued)

*Primary Examiner* — David Bochna
*Assistant Examiner* — James A Linford
(74) *Attorney, Agent, or Firm* — Brinks Gilson & Lione (57) ABSTRACT

A block fitting for connecting components in a vehicular refrigeration system includes male and female blocks defining aligned bores that provide fluid communication between the assembled blocks. A primary seal member is disposed between the blocks in fluid tight relation. A separate secondary seal member spaced from the primary seal member is provided between the blocks. The seal members are pre-assembled onto one of the blocks to form a pre-assembled sub-assembly. In one form, the primary seal member is retained on the block by a polymeric guide ring.

17 Claims, 5 Drawing Sheets

(56) References Cited

U.S. PATENT DOCUMENTS

2003/0080554 A1* 5/2003 Schroeder .............. F16L 21/08
　　　　　　　　　　　　　　　　　　　　285/125.1
2015/0115603 A1 　4/2015 Trombley et al.

FOREIGN PATENT DOCUMENTS

FR　　　　　2849150 A1　6/2004
JP　　　2009-127809　　　6/2009
JP　　　2009127809 A　*　6/2009　........... F16L 23/032

OTHER PUBLICATIONS

International Search Report and Written Opinion dated Nov. 24, 2016.
Chinese First Office Action dated Mar. 5, 2019.
European Search Report EP 16766129.7.

* cited by examiner

BLOCK FITTING AND SEAL STRUCTURE

This application claims priority pursuant to Title 35 USC § 120 to the U.S. Provisional Application Ser. No. 62/210,266, filed Aug. 26, 2015, entitled, Block Fitting and Seal Structure, the entire content of which is here by incorporated by reference as if fully set forth herein.

BACKGROUND OF THE DISCLOSURE

This disclosure relates to a block fitting for a vehicular air conditioning system that includes a rigid primary seal for the refrigerant conduit and a second, polymeric seal, spaced from the primary seal. More particularly, it relates to such a block fitting wherein the seals are pre-assembled in place to one block for creating a fluid tight seal on joinder of the blocks.

Vehicular air conditioning systems contain one of a variety of environmentally acceptable refrigerants. Concerns about the release of refrigerants into the atmosphere have led to regulations that mandate operation of refrigeration systems with substantially no leaks. The tubes that make up the piping in these systems may be connected to one another at certain junctions using a block fitting. To connect opposing tubes, for example, each tube is attached to a respective element of the block fitting, and the two blocks are then connected to one another. The joint is sealed by a primary seal member of deformable metal or other suitable material. Often a secondary polymeric seal is also provided within the fitting joint. Typically, vehicular air conditioning systems include components from several sources assembled by the OEM. It is common for one block of a block fitting to be integral with a major system component such as a compressor or condenser and the mating fitting element part of the line set. Modern assembly procedures mandate simplified component delivery and handling. An enhancement provided in this disclosure is that the interposed seals accompany one of the blocks as a pre-assembled sub-assembly. Such an approach eliminates separate processing of seal components, thereby improving productivity.

BRIEF SUMMARY OF THE DISCLOSURE

A block fitting for connecting sections in a refrigeration system includes a male block having a bore or passage extending therethrough and a female block also having a bore or passage extending therethrough. The blocks are disposed in mated relation with the bores aligned to provide a conduit through the fitting. Primary and secondary seal member members, disposed between the male and female blocks combine to provide a fluid tight seal between the blocks and also to protect against ingress of contaminants. The seals are carried by one of the blocks as a sub-assembly for later disposition in sealing relation to each block on assembly of the fitting.

DETAILED DESCRIPTION OF THE ILLUSTRATED EMBODIMENTS

Figure 1:
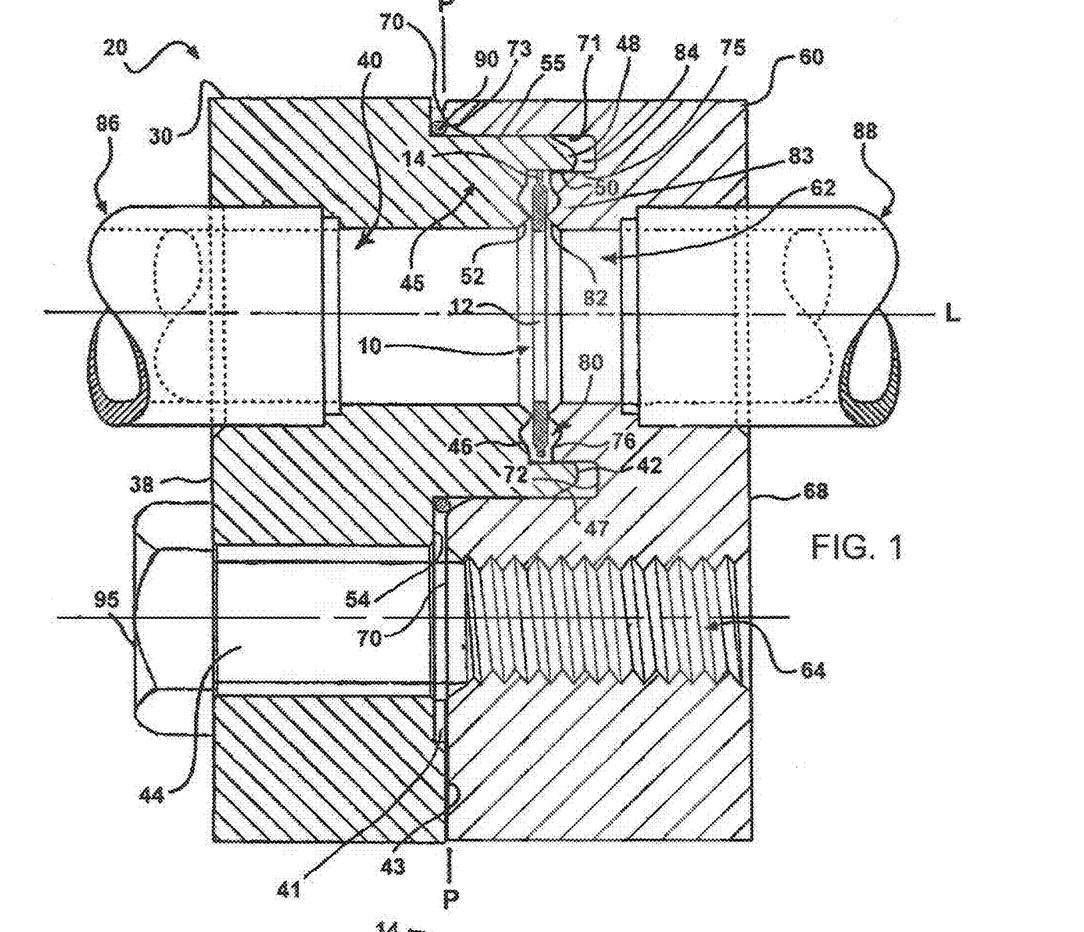
FIG. 1 is a cross-sectional view of a block fitting of the present disclosure including a primary seal and an environmental seal spaced from the primary seal pre-assembled onto one of the fitting blocks.

Turning now to the drawings, FIG. 1 shows a block fitting 20. As illustrated, the block fitting 20 includes a male block 30 and a female block 60 that define boundary surfaces that are brought into facing relation generally along mating plane "P" to form a fluid tight connection of refrigerant tubes 86 and 88 aligned along a longitudinal axis "L". Though illustrated as joining spaced tube sections 86 and 88, the block fitting 20 could, for example, join a tube such as tube 86 to a system component such as a compressor or evaporator or other element.

In this disclosure, longitudinal or axial means along the longitudinal axis "L." Longitudinally inward means toward the mating plane "P" and longitudinally outward means in the opposite direction. Radially inward means toward the longitudinal axis "L" and radially outward means away from the longitudinal axis.

Male block 30 includes a first bore or passage 40 and a second bore or passage 44 each of which are substantially circular in cross-section and extend through the block 30 from a planar longitudinal outer end surface 38 to a planar longitudinal inner end surface 54. Tube 86 extends longitudinally outward from planar longitudinal outer end surface 38 and is suitably secured within bore 40 by brazing, or the like. Bore 40 defines a fluid conduit through block 30.

Bore 44 is configured to receive a securement fastener as will be explained. Planar longitudinal inner end surface 54 includes an inward directed step 41 that defines planar longitudinal innermost step surface 43.

Surrounding the first bore 40 and extending from planar longitudinal inner end surface 54 longitudinally inward toward female block 60 is an annular shoulder 45 defined by outer cylindrical surface 55. Shoulder 45 originates at planar longitudinal inner surface 54 and terminates in radial annular inner end surface 42. Outer cylindrical surface 55 and radial annular inner end surface 42 are joined by chamfer 47. A counter bore, defined by inner cylindrical surface 50, extends longitudinally outward from radial annular inner end surface 42 and terminates in radial annular surface 46 surrounding first bore 40. In this embodiment, the outer cylindrical surface 55, inner cylindrical surface 50 and radial annular inner end surface 42 define an annular extension or lip 48 integral with annular shoulder 45.

A first sealing bead 52 extends annularly around the radial annular surface 46 adjacent its radially inner edge. The first sealing bead 52 is shown as having a v-shaped cross-section. However, other shapes can be used such as a curved radius, rectangular, or other shape. Only one sealing bead 52 is shown, however, a plurality of radially spaced sealing beads 52 can be used if desired, resulting in concentric rings on the radial annular surface 46.

Similar to the male block 30, the female block 60 includes a first bore or passage 62 and a second bore or passage 64 of substantially cylindrical cross-section that extend through the block 60 from a planar longitudinal outer end surface 68 to a planar longitudinally inner end surface 70. Tube 88 extends outward from planar longitudinal outer end surface 68 and is suitably secured within bore 62 by brazing or other process to create a fluid tight connection.

Bore 62 defines fluid conduit through block 60. When block fitting 20 is assembled, bore 40 of male block 30 and bore 62 of female block 60 are aligned along centerline "L" to define a fluid conduit or passage between tube 86 and tube 88.

In this illustrated embodiment, second bore 64 of female block 60, which is aligned with second bore 44 of male block 30, is threaded to receive a clamping fastener as will be explained.

Cylindrical bore surface 71 concentric about centerline "L" extends longitudinally outward from planar longitudinal inner end surface 70 and terminates in radial annular surface 72. Planar longitudinal inner end surface 70 and cylindrical bore surface 71 are joined by a chamfer 73.

Within cylindrical bore surface 71 is an annular longitudinal inwardly directed pedestal 83 defined by radial annular cylindrical surface 75 that terminates at radial annular surface 76 that surrounds the first bore 62. The annular space between cylindrical bore surface 71 and radial outward cylindrical surface 75 of the annular longitudinally inwardly directed pedestal 83 forms an annular groove 84 open toward male block 30. On joinder of blocks 30 and 60, annular groove 84 receives annular extension or lip 48 of annular shoulder 45 of male block 30 with radial annular surface 76 and radial annular surface 46 disposed in spaced apart facing relation surrounded by inner cylindrical surface 50 to form primary seal chamber 80.

Similar to the first sealing bead 52 of male block 30, the radial annular surface 76 of the female block 60 includes a first sealing bead 82 that extends annularly around the first bore 62 adjacent the radially inner edge of the annular surface 76. Again, this sealing bead 82 may be of a shape other than the shown v-shaped cross-section, such as a curved radius, rectangular, or other shape. Further, a plurality of sealing beads 82 can be used in place of the single bead shown, if desired.

The second bore 44 of the male block 30 and second bore 64 of the female block 60 are used to secure the two components of the block fitting 20 together. In the illustrated embodiment, the second bore 64 is threaded to allow a fastener, such as a bolt 95 seen in FIG. 1, to tightly hold the female block 60 against the male block 30 with planar longitudinal innermost stop surface 43 of block 30 in contact with planar longitudinal inner end surface 70 of block 60 along plane P.

Figure 2:
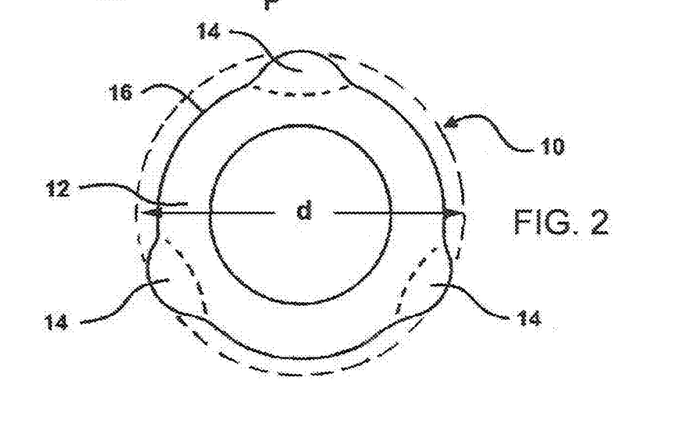
FIG. 2 is a plan view of the primary seal member of FIG. 1 including a seal portion and a positioning and retention portion.

In the embodiment shown in FIG. 1, the primary seal member 10 includes body portion 12 that has the shape of a flat annular ring. As best seen in FIG. 2, seal body portion 12 is shaped substantially as a flat annular ring with spaced planar surfaces with positioning and retention protrusions 14 extending radially outwardly from body portion 12.

The primary seal member 10 may be formed by stamping a flat ring from a sheet of a material. The protrusions 14 can then be formed by stamping the outer edge of the flat ring in certain locations to push material outward from an edge of the original flat ring. Alternatively, the primary seal member 10 could be shaped in a single step, for example, by stamping both the body portion 12 and the protrusions 14 from a sheet of material simultaneously. Alternatively, the primary seal member 10 may be made by molding a rigid component, simultaneously forming body portion 12 and protrusions 14.

In the embodiment shown, the primary seal member 10 is produced from tin-coated copper. However, it is understood that other materials used for seals could be used as desired, such as laminated tetrafluoroethylene, rubber-coated aluminum, PEEK, Vespel, pewter, babbit, bronze, nickel, polyamide, aluminum and other metal coated or rubber-coated metals, for example.

In the embodiment illustrated in FIG. 1, the primary seal member 10 as best seen in FIG. 2, includes three protrusions 14, positioned equally spaced about the outer perimeter of the body portion 12, in this illustration 120° apart. The diametric dimension "d" about the outer edges of the protrusions 14 is slightly larger than the diameter of the inner cylindrical surface 50 of axially extending annular lip 48. When the primary seal member is disposed within inner cylindrical surface 50 of extension or lip 48 of male block 30, it is retained by frictional engagement of the outer edges of protrusions 14 with inner cylindrical surface 50. The primary seal member is disposed with the spaced planar surfaces of seal ring portion 12 aligned for engagement with seal beads 52 and 82 of radial annular surfaces 46 and 76.

Specifically, an outer edge portion of the primary seal member 10 engages with the inner cylindrical surface 50 of the axially extending lip 48. In the embodiment shown in FIG. 1, the outer edge portion of the primary seal member 10 that frictionally engages with the axially extending lip 48 is formed by the radially outward edges of protrusions 14 that project radially outward from body portion 12 of the primary seal member 10. In this regard, the diameter about the radially outer edges of protrusions 14 is slightly larger than the diameter of inner cylindrical surface 50 of axially extending lip 48.

Three protrusions 14 are positioned around the outer circumference 16 of the primary seal member 10. When the positioning structure 14 is formed by protrusions, as shown, it is preferable that the primary seal member 10 include at least three protrusions 14. The primary seal member 10 may, of course, include additional protrusions 14 around the outer circumference 16 of the primary seal member 10.

As shown in FIG. 1, the body portion 12 forms a primary seal by compression between the sealing beads 52 and 82 of the male block 30 and the female block 60. The sealing beads 52 and 82, which extend annularly around the conduit contact the opposing spaced planar surfaces of the body portion 12 to provide a fluid tight seal at the primary seal chamber 80 between conduits defined by first bore 40 and first bore 62 of the male and female blocks 30 and 60.

In addition to the primary seal member 10, the block fitting 20 also includes a secondary seal member 90 that surrounds the outer perimeter of annular shoulder 45 at planar longitudinal inner end surface 54 of block 30. In this embodiment, secondary seal member 90 is essentially an environmental seal, to prevent ingress of contaminants. It is positional in sealing contact with opposed boundary surfaces of male block 30 and female block 60 to provide a secondary barrier between the joined blocks. It may primarily exclude external contaminants, or it may provide enhanced resistance to leakage of the system fluid.

The boundary surfaces between the male and female blocks 30 and 60 create a generally radially extending flow path from seal chamber 80 of the conduit formed by first bore 40 of block 30 and first bore 62 of block 60 to the surrounding environment. Both the primary seal member 10 and the secondary seal member 90 are positioned along this path so to prevent fluid exchange between the inside of the conduit and the surrounding environment.

The secondary seal member 90 is positioned exteriorly to the primary or main seal formed by the primary seal between sealing beads 52 and 82 and primary seal member 10. The primary seal member 10 is positioned along the path at a location that is closer to the main flow path through the blocks. In the illustrated embodiment, the environmental seal 90 is also radially outside the primary seal member 10. However, it is also possible for the environmental seal 90 to be radially aligned with the primary seal structure but still positioned exteriorly to the primary seal member 10 along the path between the blocks 30 and 60 from seal chamber 80 to the environment. Preferably, the environmental seal 90 is elastomeric. For example, the environmental seal 90 may be an polymeric 0-ring.

As illustrated, the environmental seal 90 is positioned remote from the primary seal member 10, as shown. The word remote as defined herein means that the environmental seal 90 is not adjacent to the primary seal member 10. In other words, the body material that forms the primary seal member 10 is spaced from, and not in contact with the body material that forms the secondary seal member 90.

To assemble the block fitting 20, the blocks 30 and 60 are connected with annular extension or lip 48 of male block 30 inserted into annular groove 84 of female block 60 with inner cylindrical surface 50 surrounding radial annular surface 46 of male block 30 and radial annular surface 76 of female block 60. The primary seal member 10 is frictionally retained within the inner cylindrical surface 50 centering the primary seal member 10 relative to radial annular surfaces 46 and 76. As best seen in FIG. 1, when the block fitting 20 is assembled, primary seal member 10 is disposed between the first sealing bead 52 on annular surface 46 of male block 30 and first sealing bead 82 on annular surface 76 of female block 60. The primary seal member 10 seals the joint of the conduit formed between the first passages 40 and 62 by engagement of flat ring body portion 12 by first sealing bead 52 and first sealing bead 82 at annular surfaces 46 and 76 within primary seal chamber 80.

The environmental seal 90 is positioned at the base of the annular shoulder 45 at planar longitudinal inner end surface 54. The male and female blocks 30 and 60 are brought together until the sealing beads 52 and 82 abut the sealing body 12 of the primary seal member 10 and the planar longitudinal inner end surface 70 of the female block 60 engages the environmental seal 90. The planar longitudinal innermost step surface 43 of inward directed step 41 contacts planar longitudinal inner end surface 70 of female block 60 along plane "P" to set the relationship between the joined blocks. This spacing controls the degree of compression of seal body portion 12 of primary seal member 10 by sealing beads 52 and 82 to ensure a fluid tight joint between the male block 30 and female block 60 in seal chamber 80. It also provides the requisite compression of 0-ring seal 90 between planar longitudinal inner end surface 70 of female block 60 and planar longitudinal inner end surface 54 of male block 30.

A fastener such as bolt 95 shown in FIG. 1 is inserted through the second bore 44 and tightened in threaded bore 64 of female block 60 to secure the block fitting assembly together.

The sealing beads 52 and 82 contact the spaced planar surfaces of the flat annular ring of primary seal member 10 and deform the sealing body 12 of the primary seal member 10 to form the primary seal between the blocks 30 and 60. The environmental seal 90 is deformed by the surface 70 of the female block 60 against surface 54 of male block 30. Once assembled, the male block 30 and the female block 60 cooperate with the primary seal member 10 to form a fluid tight seal, and prevent leakage of a fluid (liquid or gas) from the tubes 86 and 88. If an amount of the fluid flowing through the tubes 86 and 88 leaks past the primary seal member 10, the environmental seal 90 can guard against the leakage of the fluid from the block fitting 20 to the atmosphere. The secondary seal member 90 also keeps harmful contaminants away from the primary seal member 10.

Figure 3:
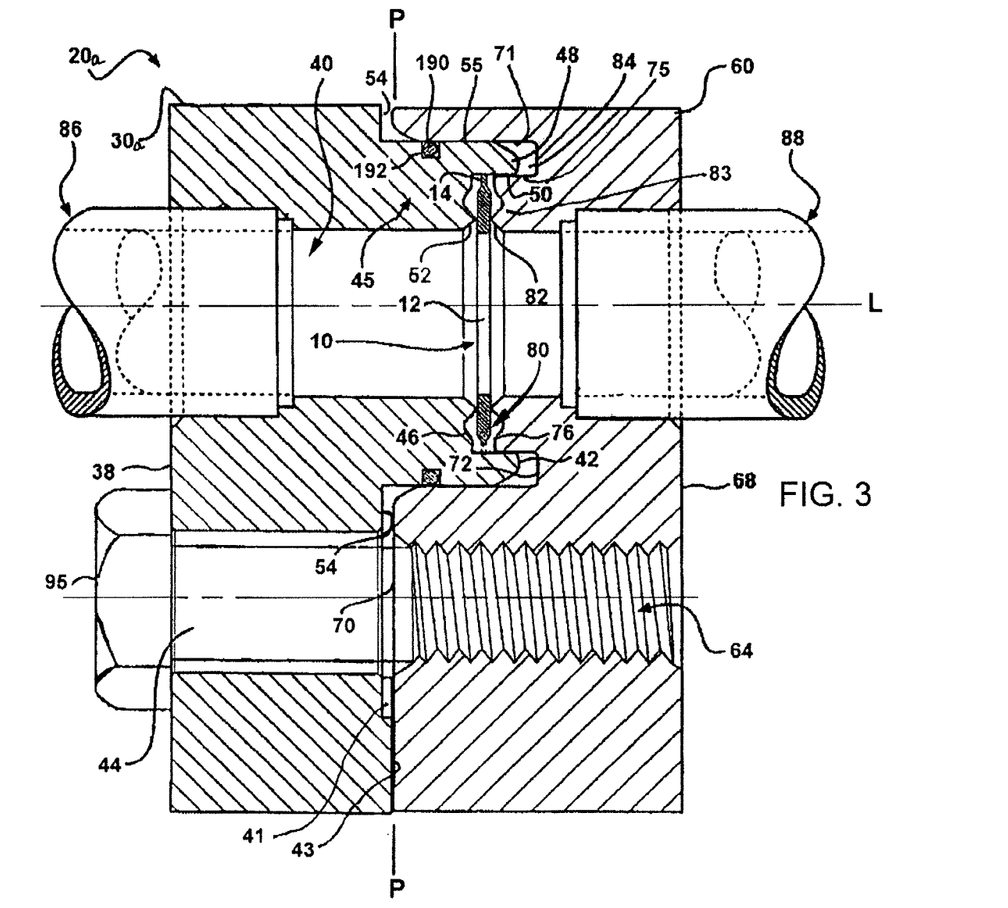
FIG. 3 is a cross-sectional view of another embodiment of a block fitting including a pre-assembled primary seal and secondary seal member spaced from the primary seal.

FIG. 3 shows another embodiment of a block fitting 20a with a modified secondary seal member arrangement. It includes a male block 30a and a female block 60 of substantially the same configuration as the block 30 and block 60 of the embodiment of FIG. 1. The block fitting 20 also includes a primary seal member 10 positioned between sealing beads 52 and 82 of the male and female blocks 30a and 60, respectively. A primary seal member 10, as illustrated in FIG. 2 and previously described, may be frictionally held within the male block 30a by frictional engagement between an outer edge portion of protrusions 14, and the inner circumferential surface 50 of the axially extending lip 48 of the male block 30a.

When the block fitting 20a is assembled, the male block 30a is positioned such that the annular extension or lip 48 of shoulder 45 resides within the annular groove 84 of the female block 60. The axially extending annular lip 48 of the male block 30a is configured to slidably fit within the annular groove 84 of the female block 60. As in the previous embodiment, the first apertures 40 and 62 of the male and female blocks 30a and 60 are axially aligned forming a continuous conduit running through the block fitting 20 along axis "L." Radial annular surface 46 of male block 30 and radial annular surface 76 are disposed in spaced apart facing relation surrounded by inner cylindrical surface 50 of lip 48 to define primary seal chamber 80. Radially outer edges of protrusions 14 of primary seal member 10 are frictionally retained within inner cylindrical surface 50. On completion of assembly seal body portion 12 is compressed between sealing bead 52 on radial annular surface 46 of male block 30a and sealing bead 82 on radial annular surface 76 of female block 60 to provide a fluid tight joint.

The embodiment shown in FIG. 3 differs from that of FIG. 1 in that an annular groove 192 is provided in the radially outer cylindrical surface 55 of the annular shoulder 45 of male member 30a. Groove 192 is spaced longitudinally inward from planar longitudinal inner end surface 54 a sufficient distance to be disposed in facing relation to cylindrical bore surface 71 of female block 60.

In order to create an effective seal between the annular shoulder 45 and the cylindrical bore surface 71 of female member 60, a secondary seal member 190 is disposed in annular groove 192. It is slightly larger in cross section than the depth of the groove 192. It is compressed against cylindrical bore surface 71 to form a fluid tight seal. Accordingly, the secondary seal member 190, which may be an polymeric 0-ring, deforms when the male block 30a is mated with the female block 60. This secondary seal member provides a secondary barrier to egress of refrigerant in the event of a primary seal malfunction.

Alternatively to the illustrated embodiment, a groove such as groove 192 may be located in the cylindrical bore surface 71 of the female block 60 containing a secondary seal member such as 0-ring 190 to seal against radially outer cylindrical surface 55 of shoulder 45 of male member 30a. The secondary seal, of course, could be positioned at other locations along the boundary surfaces between the male block 30a and female block 60.

Figures 4, 5, 6:
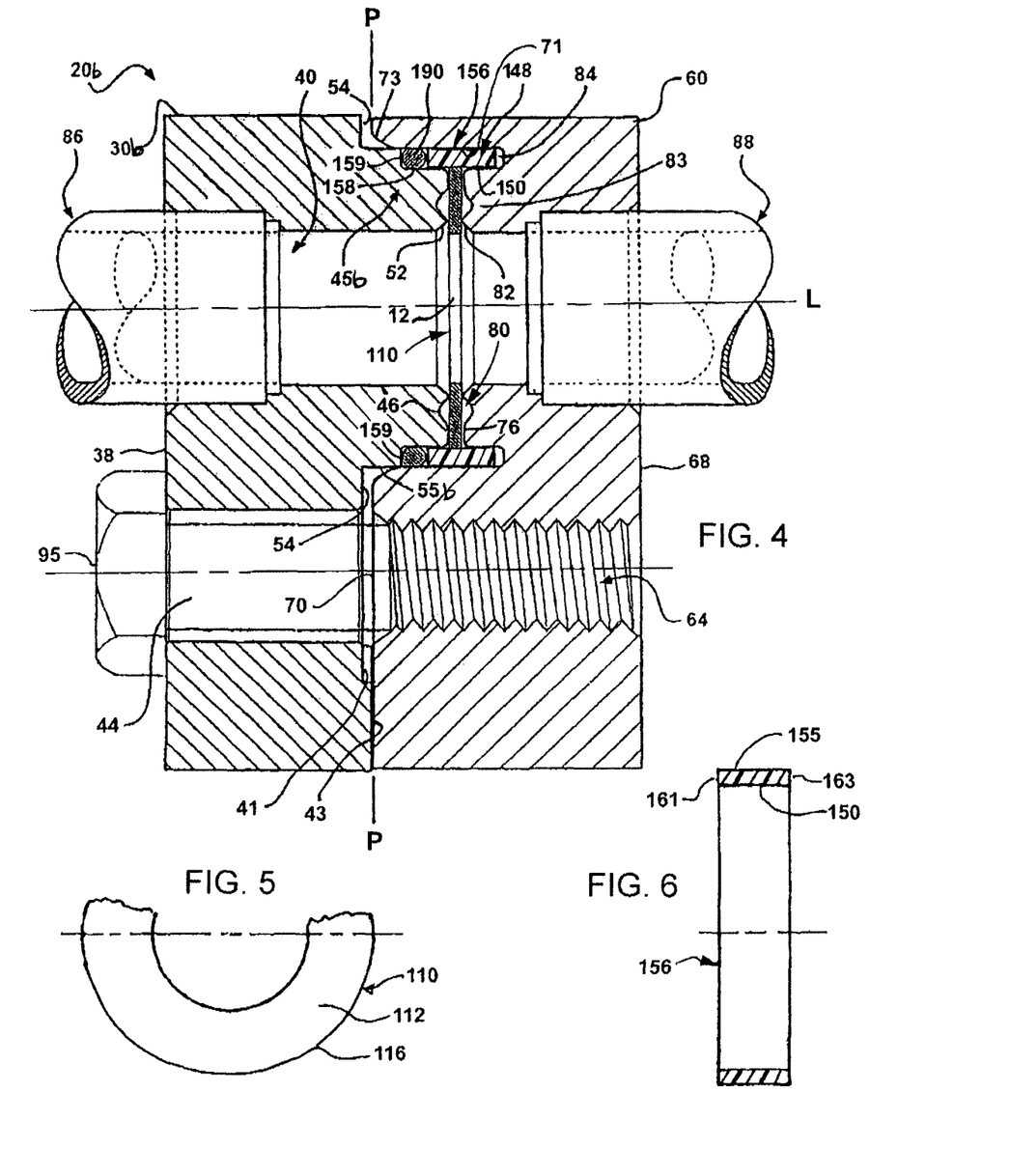
FIG. 4 is a cross-sectional view of yet another embodiment of a block fitting including a primary seal member and a spaced secondary seal member in which the seals are pre-assembled onto one fitting block.
FIG. 5 is a sectional side view of the annular polymeric guide sleeve of the embodiment of FIG. 4.
FIG. 6 is a fragmentary plan view of the primary seal ring of the embodiment of FIG. 4.

FIG. 4 shows yet another embodiment of a block fitting 20b. The embodiment shown in FIG. 4 differs from those of FIGS. 1 and 3 in that the annular extension or lip of annular shoulder 45b is defined by an annular polymeric guide sleeve 156 positioned at the longitudinal inner end of shoulder 45b.

Male block 30b and female block 60 are of similar configuration to male block 30b and female block 60 of the embodiments of FIGS. 1 and 2, except as described below. Primary seal member 110 somewhat modified as compared to the primary seal member 10 of the embodiments of FIGS. 1 and 2 is positioned in sealing engagement between sealing beads 52 and 82 of the male block 30b and female block 60. In this embodiment, primary seal member 110 is held upon the male block 30b as a pre-assembled sub-assembly by frictional engagement between the polymeric guide sleeve 156 and the primary seal member 110.

As illustrated in FIG. 4, shoulder 45b includes a reduced diameter cylindrical surface 158 at outer cylindrical surface 55b that extends longitudinally outwardly from radial annular surface 46 to a radial annular step surface 159. Radial annular step surface 159 is positioned longitudinally inwardly relative to planar longitudinal inner end surface 54 such that it is disposed longitudinally inward of chamfer 73 of female block 60 when blocks 30b and 60 are assembled. With the blocks 30b and 60 assembled together, reduced diameter cylindrical surface 158 of male block 30b is spaced radially inward of cylindrical bore surface 71 of female block 60 to define an extension of annular groove 84.

Polymeric annular guide sleeve 156 is attached to the shoulder 45b at reduced diameter cylindrical surface 158. Annular polymeric guide sleeve 156 is an polymeric annular body having an inner cylindrical surface 150 slightly smaller than the diameter of reduced diameter cylindrical surface 158. It has an outer cylindrical surface 155 slightly smaller than the cylindrical bore surface 71 of female block 60. Seen in FIG. 5, it has a longitudinal annular radial outer end 161 and a longitudinal annular radial inner end 163.

The axial or longitudinal length of polymeric guide sleeve 156 is such that when positioned on reduced diameter cylindrical surface 158, polymeric guide sleeve 156 extends longitudinally inward beyond radial annular surface 46 of shoulder 45b to form annular extension or lip 148 extending longitudinally inward from annular shoulder 45b. When blocks 30b and 60 are assembled together, the radial annular surface 46 of male block 30 and the radial annular surface 76 of female block 60 are disposed in spaced apart facing relation surrounded by inner cylindrical surface 150 of polymeric guide sleeve 156.

The annular polymeric guide sleeve 156 is attached to reduced diameter cylindrical annular surface 158 of shoulder 45 with radial annular outer end surface 161 spaced from radial annular step surface 159 to define a groove with reduced diameter cylindrical surface 158, similar to the groove 192 of the embodiment of FIG. 3. An polymeric 0-ring secondary seal member 190, similar to the 0-ring secondary seal member 190 of the embodiment of FIG. 3, is disposed in the groove and functions as a secondary fluid tight seal as described in connection with the embodiment of FIG. 3. This seal also prevents ingress of contaminants as in the previous embodiments The annular polymeric guide sleeve 156 also functions as an alignment aid during assembly of the male block 30b onto female block 60. Longitudinal radial inner end 163 coacts with cylindrical bore surface 71 to guide the insertion of the shoulder 45 of male block 30b into groove 84 of female block 60. It ultimately resides adjacent inner cylindrical surface 150 of pedestal 83 within annular groove 84. Notably, since the outer diameter of guide sleeve 156 is smaller than the inner diameter of cylindrical bore surface 71, the guide sleeve 156 performs no sealing function relative to cylindrical bore surface 71.

A primary seal member 110 is similar to primary seal member 10 of the embodiments of FIGS. 1 to 3, however, it need not include protrusions such as the protrusion 14 of the earlier embodiments. Best seen in FIG. 6, it has an annular body 112 defined by spaced planar annular surfaces with an outer circumferential edge 116 having a diameter about the same size, or slightly larger than the diameter of reduced diameter cylindrical surface 158 of annular shoulder 45b. It provides a primary seal between the male block 30b and female block 60 through compressive contact of its planar annular surfaces with first sealing bead 52 of male block 30b and first sealing bead 82 of female block 60 in seal chamber 80 as in the previous embodiments.

To provide a pre-assembled sub-assembly for future assembly of a block fitting 20, primary seal member 110 and secondary polymeric seal member in the form of 0-ring 190 are attached to male block 30. In this regard, secondary seal member or 0-ring 190 may first be assembled onto reduced diameter cylindrical surface 158 of shoulder 45. It is positioned in abutment with radial annular step surface 159. Inner cylindrical surface 150 of polymeric annular guide sleeve 156 is frictionally engaged upon reduced diameter cylindrical surface 158 and positioned toward radial annular step surface 159 such that longitudinal annular radial outer end 161 forms a groove within which secondary seal member 190 is captured. The radial surfaces 159 and 161 may be positioned closer together than the diameter of the 0-ring secondary seal member 190 to deform it radially outward. As in the prior embodiment of FIG. 3, the 0-ring secondary seal member is sized to be compressed against cylindrical bore surface 71 on connection of blocks 30b and 60.

Primary seal member 110 is captured about its outer peripheral edge 116 within the inner cylindrical surface 150 of polymeric guide sleeve 156 and is held in position overlying radial annular surface 46. It is thus disposed for compressive engagement of its planar annular surfaces by first sealing bead 52 of male block 30b and first sealing bead 82 of female block 60 on assembly of block fitting 20b.

The primary seal member 110 is held in place within the male block 30b by annular polymeric guide sleeve 156. Specifically, outer circumferential edge 116 of the primary seal member 110 frictionally engages with the inner cylindrical surface 150 of annular polymeric guide sleeve 156.

In the illustrated embodiment, the primary seal member 110 is formed as a flat ring and does not include any protrusions such as those in the previous embodiments. However, it is also possible that the primary seal member 110 could include radial protrusions with outer edge portions frictionally engaged within inner cylindrical surface 150 of annular polymeric guide sleeve 156. As in the embodiments of FIGS. 1-3, the seal member 110 may be formed of tin-coated copper, laminated tetrafluoroethylene, rubber-coated aluminum, PEEK, Vespel, pewter, babbit, bronze, nickel, polyamide, aluminum and other metal coated or rubber-coated metals, for example. Preferably, the polymeric guide sleeve 156 is made of an polymeric material with some resilience or restoring force compatibility to frictionally engage reduced diameter cylindrical surface 158 as well as capture and retain the primary seal member 110 within inner cylindrical surface 150.

Figure 7:
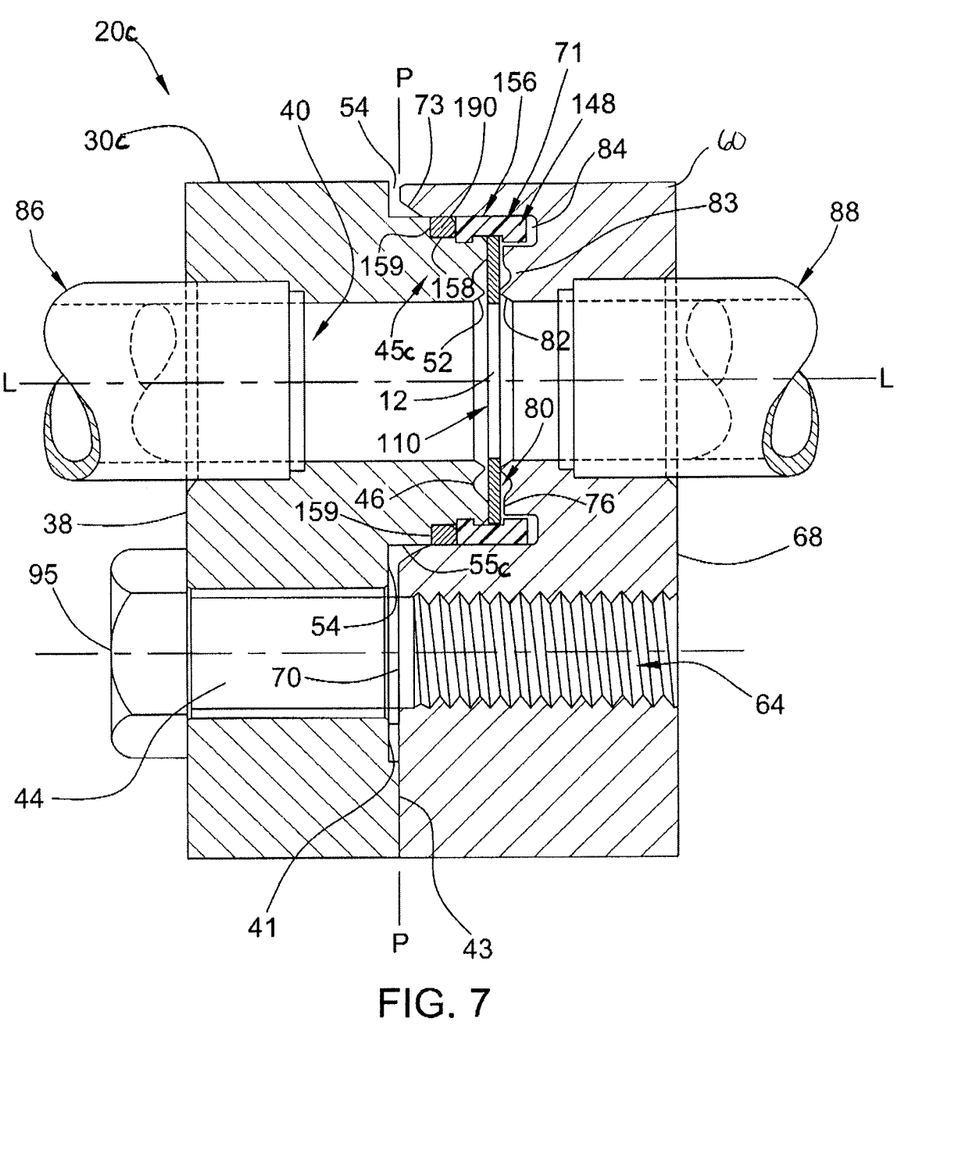
FIG. 7 is a cross-sectional view of yet another embodiment of a block fitting including a primary seal member and a spaced secondary seal member in which the seals are pre-assembled onto one fitting block.

FIG. 7 shows yet another embodiment of a block fitting 20*c*. The embodiment shown in FIG. 7 differs from those of FIGS. 1 and 3 in that as in the embodiment of FIG. 4, the annular extension or lip of annular shoulder 45*c* is defined by an annular polymeric guide sleeve 256 positioned at the longitudinal inner end of shoulder 45*c*. It serves to retain a primary seal member 110 to male block 30*c* as pre-assembled sub-assembly. It differs from the embodiment of FIG. 4 in the manner of connection to shoulder 45*c* and the manner of retention of primary seal member 110 on male block 30*c*.

As illustrated in FIG. 7, shoulder 45 includes a reduced diameter cylindrical surface 158 on outer cylindrical surface 55*c* of annular shoulder 45*c* that extends longitudinally outwardly from radial annular surface 46 to a radial annular step surface 159. Radial annular step surface 159 is positioned longitudinally inwardly relative to planar longitudinal inner end surface 54 such that it is disposed longitudinally inward of chamfer 73 of female block 60 when blocks 30*c* and 60 are assembled. In this embodiment, reduced diameter cylindrical surface 158 includes a radial groove 159 intermediate radial annular step surface 159 and radial annular surface 46.

Polymeric annular guide sleeve 256 is attached to the shoulder 45*c* at reduced diameter cylindrical surface 158. Annular polymeric guide sleeve 256 is an polymeric annular body having an inner cylindrical surface 250 having a diameter sized to slide freely onto reduced diameter cylindrical surface 158. Polymeric guide sleeve 256 has an outer cylindrical surface 255 slightly smaller than the cylindrical bore surface 71 of female block 60. Seen in FIG. 8, it has a longitudinal annular radial outer end 261 and a longitudinal annular radial inner end 263. It includes a plurality of radially inwardly directed ribs 265 adjacent its longitudinal outer end 261 and a plurality of radially inwardly directed ribs 266 adjacent its longitudinally inner end 263. Ribs 266 include longitudinal outward radial surfaces 267 that face radial annular surface 46.

Figures 8, 9, 10:
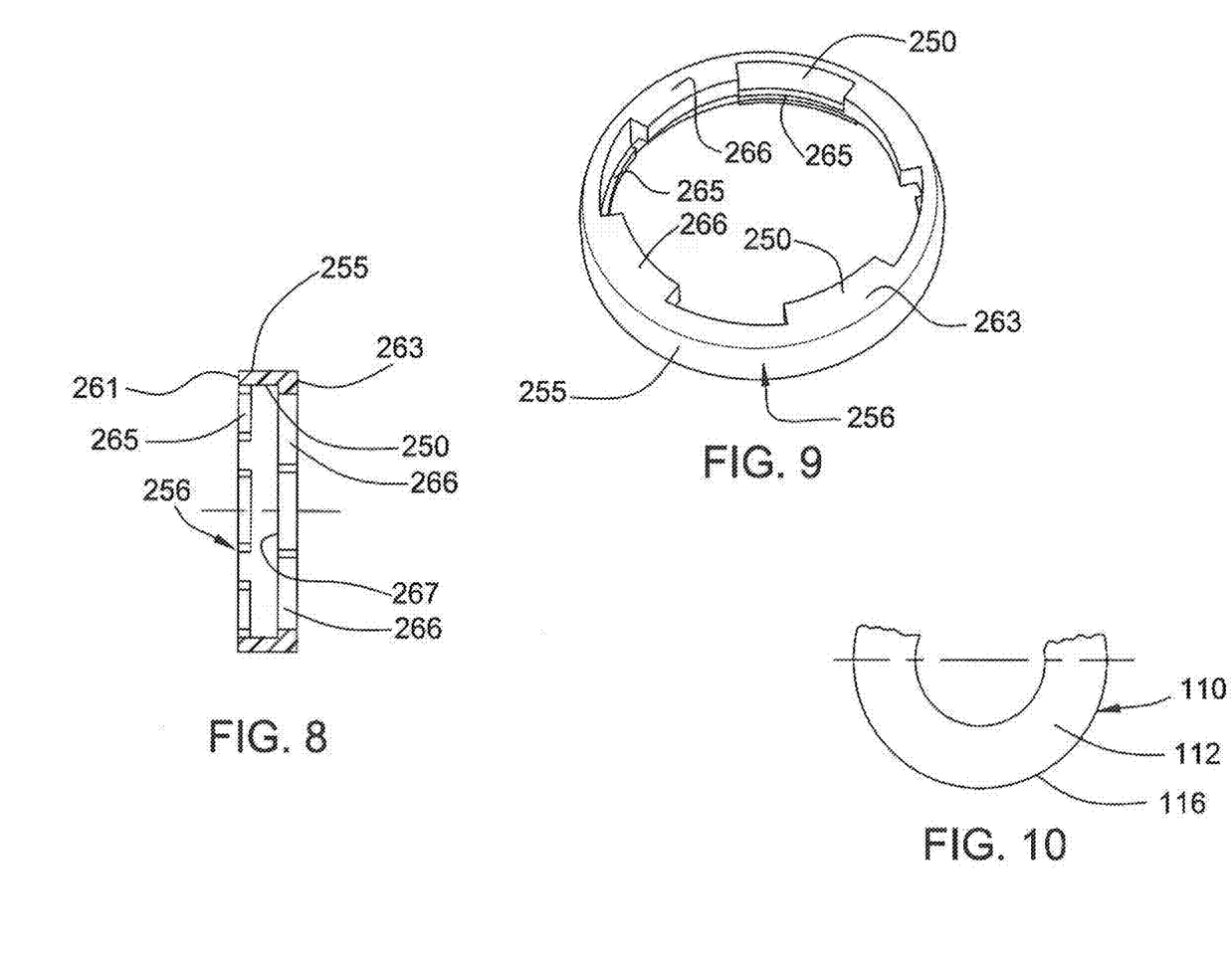
FIG. 8 is a sectional side view of the annular polymeric guide sleeve of the embodiment of FIG. 7.
FIG. 9 is a perspective view of the polymeric guide sleeve of the embodiment of FIG. 7.
FIG. 10 is a fragmentary plan view of the primary seal member of the embodiment of FIG. 7.

Radially inward directed ribs 265 have an inner diameter such that, on attachment of polymeric guide sleeve 256 to reduced diameter cylindrical surface 158 of annular shoulder 45*c* they reside in groove 157 in reduced diameter cylindrical surface 158 to releasably secure the polymeric guide sleeve 256 to annular shoulder 45*c*. The length of polymeric guide sleeve 256 is such that when the inward directed ribs 265 are disposed in radial groove 157 of reduced diameter cylindrical surface 158 the longitudinal outward radial surfaces 267 of radially inward directed ribs 266 are spaced from radial annular surface 46 a distance slightly larger than the longitudinal thickness of primary seal member 110 between its spaced planar annular surfaces.

The axial or longitudinal length of polymeric guide sleeve 256 is such that when positioned on reduced diameter cylindrical surface 158, polymeric guide sleeve 256 extends longitudinally inward beyond radial annular surface 46 of shoulder 45*c* to form annular extension or lip 148 extending longitudinally inward from annular shoulder 45*c* toward radial annular surface 76. When blocks 30*c* and 60 are assembled together, the radial annular surface 46 of male block 30*c* and the radial annular surface 76 of female block 60 are disposed in spaced apart facing relation.

The annular polymeric guide sleeve 256 is attached to reduced diameter cylindrical surface 158 of shoulder 45*c* by ribs 265 positioned in groove 157 of reduced diameter cylindrical surface 158. Radial annular outer end surface 261 is spaced from radial annular step surface 159 to define a groove with reduced diameter cylindrical surface 158, similar to the groove 192 of the embodiment of FIG. 3. An polymeric 0-ring secondary seal member 190, similar to the 0-ring secondary seal member 190 of the embodiment of FIG. 3, is disposed in the groove and functions as a secondary fluid tight seal as described in connection with the embodiment of FIG. 4. This seal also prevents ingress of contaminants as in the previous embodiments.

In this embodiment, the annular polymeric guide sleeve 256 also functions as an alignment aid during assembly of the male block 30 onto female block 60. Longitudinal radial inner end 263 coacts with cylindrical bore surface 71 to guide the insertion of the shoulder 45 of male block 30*c* into groove 84 of female block 60. It ultimately resides adjacent inner cylindrical surface 50 of pedestal 83 within annular groove 84. Notably, since the outer diameter of guide sleeve 256 is smaller than the inner diameter of cylindrical bore surface 71, the guide sleeve 256 performs no sealing function relative to cylindrical bore surface 71.

Primary seal member 110 is similar to primary seal member 110 of the embodiment of FIG. 4. Best seen in FIG. 6, it has an annular body 112 defined by spaced planar annular surfaces with an outer circumferential edge 116 having a diameter about the same size, or slightly smaller than the diameter of reduced diameter cylindrical surface 158 of annular shoulder 45*c*. It provides a primary seal between the male block 30 and female block 60 through compressive contact of its planar annular surfaces with first sealing bead 52 of male block 30*c* and first sealing bead 82 of female block 60 as in the previous embodiments.

To provide a pre-assembled sub-assembly for future assembly of a block fitting 20, primary seal member 110 and secondary polymeric seal member in the form of 0-ring 190 are attached to male block 30*c*. In this regard, secondary seal member, or, 0-ring 190 may first be assembled onto reduced diameter cylindrical surface 158 of shoulder 45*c*. It is positioned in abutment with radial annular step surface 159. Annular polymeric guide sleeve 256 is engaged upon reduced diameter cylindrical surface 158 by radially directed ribs 265 disposed in radial groove 157. It is positioned toward radial annular step surface 159 such that radial annular outer end surface 161 forms a groove within which secondary seal member 190 is captured. The radial surfaces 159 and 161 may be positioned closer together than the diameter of the 0-ring secondary seal member 190 to deform it radially outward. As in the prior embodiment of FIG. 4, the 0-ring secondary seal member is sized to be compressed against cylindrical bore surface 71 on connection of blocks 30*c* and 60.

Primary seal member 110 is captured within the inner cylindrical surface 250 of polymeric guide sleeve 256 by radially inwardly directed ribs 266 and is held in position overlying radial annular surface 46 by longitudinal outward radial surfaces 267 that face radial annular surface 46. It is thus disposed for compressive engagement of its planar annular surfaces by first sealing bead 52 of male block 30*c* and first sealing bead 82 of female block 60 on assembly of block fitting 20*c*.

In this illustrated embodiment, the primary seal member 110 is formed as a flat ring and does not include any protrusions such as those in the previous embodiments. As in the embodiments of FIGS. 1-4, the seal member 110 may be formed of tin-coated copper, laminated tetrafluoroethylene, rubber-coated aluminum, PEEK, Vespel, pewter, babbit, bronze, nickel, polyamide, aluminum and other metal coated or rubber-coated metals, for example. Preferably, the polymeric guide sleeve 256 is made of an polymeric material. It should be noted that ribs 265 and 266 are illustrative and not limiting. These ribs could be formed as continuous radially annular inward rings.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

The invention claimed is:

1. A block fitting for a fluid system comprising:
a male block including a bore extending therethrough adapted for connection to the fluid system;
said male block having a radial annular surface surrounding said bore,
a female block including a bore extending therethrough adapted for connection to the fluid system,
said female block having a radial annular surface surrounding said bore,
said male block and female block joined together with said bores aligned and said radial annular surface of said male block and said radial annular surface of said female block spaced apart in facing relation,
a polymeric guide sleeve defining an annular lip having an inner cylindrical surface surrounding said radial annular surface of said male block and extending toward said radial annular surface of said female block,
a primary seal member having an annular body portion disposed between said radial annular surfaces of said blocks surrounded by said inner cylindrical surface of said annular lip,
the male block and the female block defining boundary surfaces in facing relation, wherein a secondary seal member, separate from said primary seal member, is disposed between said boundary surfaces and spaced from said primary seal member,
the polymeric guide sleeve configured to retain the primary seal member and the secondary seal member on the male block in their spaced positions for connection to the female block, the polymeric guide sleeve including a radial projection extending radially inwardly,
wherein the female block defines an annular groove and said annular lip of the polymeric sleeve extends into the annular groove of the female block, and
wherein the male block defines a reduced diameter section receiving the secondary seal member, and wherein the reduced diameter section defines a radial groove that is axially spaced from the secondary seal member, the radial groove receiving the radial projection of the polymeric guide sleeve to maintain the polymeric guide sleeve in position on the male block.

2. A block fitting as claimed in claim 1, wherein said female block defines an annular groove and said annular lip of said male block extends into said annular groove of said female block.

3. A block fitting as claimed in claim 2, wherein said annular lip of said male block includes a radially outer cylindrical surface,
and said cylindrical groove of said female block includes a cylindrical bore surface wherein said secondary seal member is disposed between said radially outer cylindrical surface of said lip and said cylindrical bore surface of said cylindrical groove.

4. A block fitting as claimed in claim 3, wherein one of said radially outer cylindrical surfaces of said lip of said male block and said cylindrical bore surface of said cylindrical groove of said female block includes an annular groove therein and said secondary seal member comprises an 0-ring disposed in said groove.

5. A block fitting as claimed in claim 4, wherein said radially outer surface of said lip of said male block includes said annular groove with said 0-ring disposed therein, said 0-ring in sealing contact with said cylindrical bore surface of said female block.

6. A block fitting as claimed in claim 1, wherein said primary seal member comprises a body portion shaped as a flat annular ring with spaced planar surfaces,
and wherein said radial annular surfaces of said male block and female block surrounding said bores in said block each include an annular sealing bead engaging one of said spaced planar surfaces of said body portion of said primary seal member.

7. A block fitting as claimed in claim 6, wherein said primary seal member includes an outer edge portion frictionally engaging said inner cylindrical surface of said annular lip of said male block.

8. A block fitting as claimed in claim 7, wherein said primary seal member includes a plurality of protrusions extending radially outward from said body portion, said protrusions frictionally engaging said inner cylindrical surface of said annular lip of said male block.

9. A block fitting as claimed in claim 8, wherein the secondary seal member abuts the guide.

10. A block fitting as claimed in claim 9, wherein said male block and said female block each include a second bore aligned with the second bore of the other of said blocks, said fitting including a fastener disposed in said second bores securing said male block and female block together.

11. A block fitting as claimed in claim 7, wherein said outer edge portion of said primary seal member is frictionally engaged with said inner cylindrical surface of said polymeric guide sleeve.

12. A block fitting as claimed in claim 11, wherein said male block includes an annular shoulder having a reduced diameter cylindrical surface extending to a radial annular step surface, said polymeric guide sleeve is supported on said reduced diameter cylindrical surface, and includes a radial annular outer end surface defining a groove with said radial annular step surface and said reduced diameter cylindrical surface, and a secondary seal member is disposed in said groove.

13. A block fitting as claimed in claim 12, wherein said male block and female block each include a second bore aligned with the second bore of the other of said blocks, said fitting including a fastener disposed in said second bores securing said male block and female block together.

14. A block fitting as claimed in claim 1, wherein said male block member includes an annular shoulder defining said radial annular surface, a polymeric guide sleeve on said shoulder surrounding said radial annular surface and including at least one radial projection adjacent a longitudinal inner end thereof, said at least one radial projection having an outward surface facing said radial annular surface of said annular shoulder of said male block and spaced therefrom a distance slightly larger than the thickness of said primary seal member, and retaining said primary seal member relative to said radial annular surface of said annular shoulder.

15. A block fitting as claimed in claim 14, wherein said annular shoulder of said male block including a reduced diameter cylindrical surface having a radial groove formed therein and said polymeric guide sleeve includes at least one radial projection adjacent a longitudinal outer end thereof disposed in said radial groove in said reduced diameter cylindrical surface of said annular shoulder.

16. A block fitting as claimed in claim 15, wherein said polymeric guide sleeve includes a plurality of radial projections adjacent said longitudinal inner end retaining said primary seal ring relative to said radial annular surface of said annular shoulder and a plurality of radial projections adjacent said longitudinal outer end disposed in said radial groove in said reduced diameter cylindrical surface of said annular shoulder.

17. A block fitting as claimed in claim 16, wherein said annular shoulder includes an outer cylindrical surface, and a radial step surface and, wherein said reduced diameter cylindrical surface, said radial step surface and said longitudinal outer end of said polymeric guide ring define an annular groove, and wherein a secondary seal member resides in said annular groove.

* * * * *